United States Patent
Honda (10) Patent No.: US 6,349,021 B1
(45) Date of Patent: Feb. 19, 2002

(54) THIN FILM MAGNETIC HEAD (75) Inventor: Kenji Honda, Niigata-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 09/481,452

(22) Filed: Jan. 11, 2000

(30) Foreign Application Priority Data

Jan. 18, 1999 (JP) .......................................... 11-009641

(51) Int. Cl.[7] .................................................. G11B 5/39
(52) U.S. Cl. ...................................... 360/317; 360/126
(58) Field of Search ................................. 360/126, 119, 360/121, 122, 123, 125, 317

(56) References Cited

U.S. PATENT DOCUMENTS 5,751,522 A    5/1998    Yamada et al. ............. 360/317
5,923,506 A  * 7/1999    Herrera ....................... 360/126
6,259,583 B1 * 7/2001    Fontana, Jr. et al. ........ 360/126

* cited by examiner

Primary Examiner—David L. Ometz
Assistant Examiner—Franklin D. Altman, III
(74) Attorney, Agent, or Firm—Brinks Hofer Gilson & Lione (57) ABSTRACT

A thin film magnetic head is able to control occurrence of Barkhausen noises attributable to configuration magnetic anisotropy of an upper shield layer. An inductive head is provided with a magnetic material layer having a space for forming a coil layer thereon. A very narrow gap is provided between a front separate layer that opposes a magnetic recording medium and a rear separate layer that opposes the front separate layer. The front separate layer serves also as an upper shield layer of an MR head and a lower core layer of the inductive head.

16 Claims, 7 Drawing Sheets

FIG. 1

HEIGHT DIRECTION

TRACK WIDTH DIRECTION

THIN FILM MAGNETIC HEAD

BACKGROUND OF THE INVENTION

1. Field of the Present Invention

The present invention relates to a thin film magnetic head and, more particularly, to a combined-type thin film magnetic head in which a read magnetoresistive (MR) head having a magnetoresistive device and a write inductive head having a coil layer and a core layer are laminated.

2. Description of the Related Art

Figure 5:
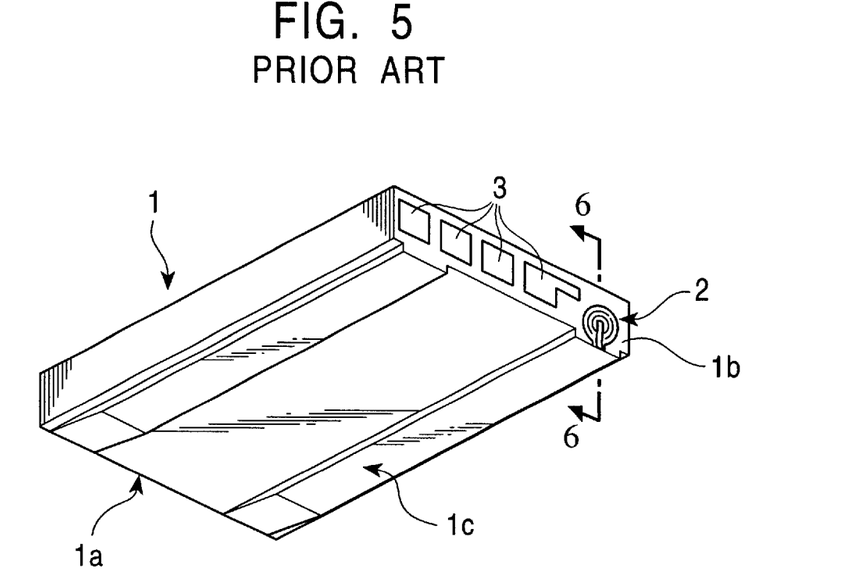
FIG. 5 is a perspective view of a conventional thin film magnetic head.
Figure 6:
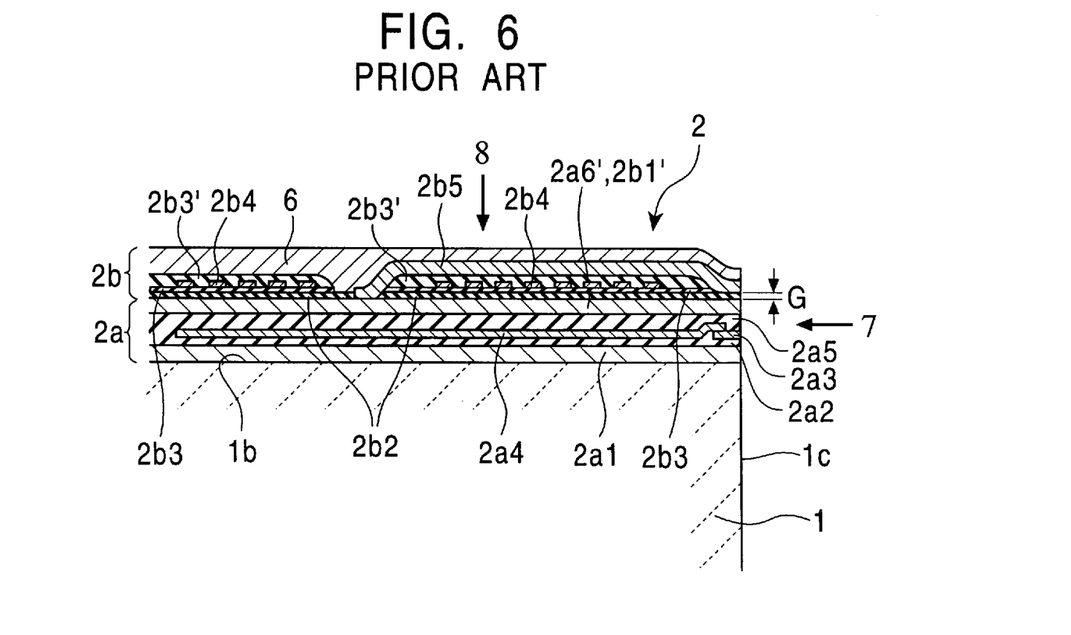
FIG. 6 is a sectional view taken along the line 6—6 of FIG. 5.
Figure 7:
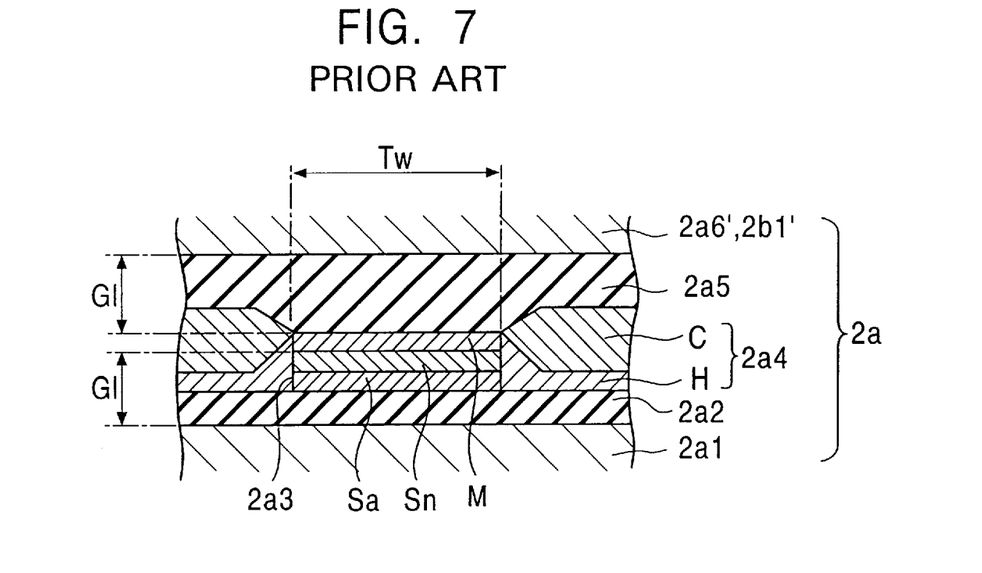
FIG. 7 is an enlarged front view observed from a direction indicated by an arrow 7 in FIG. 6.
Figure 8:
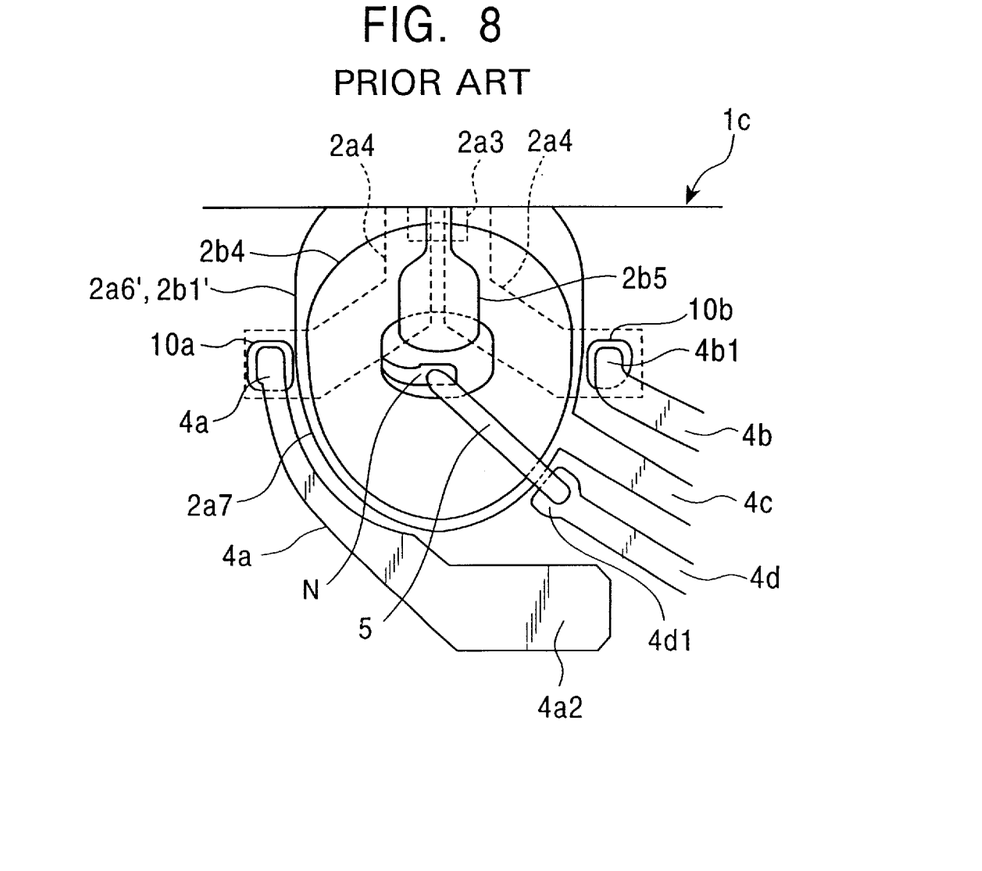
FIG. 8 is a schematic top plan view observed from a direction indicated by an arrow 8 in FIG. 6.
Figure 9:
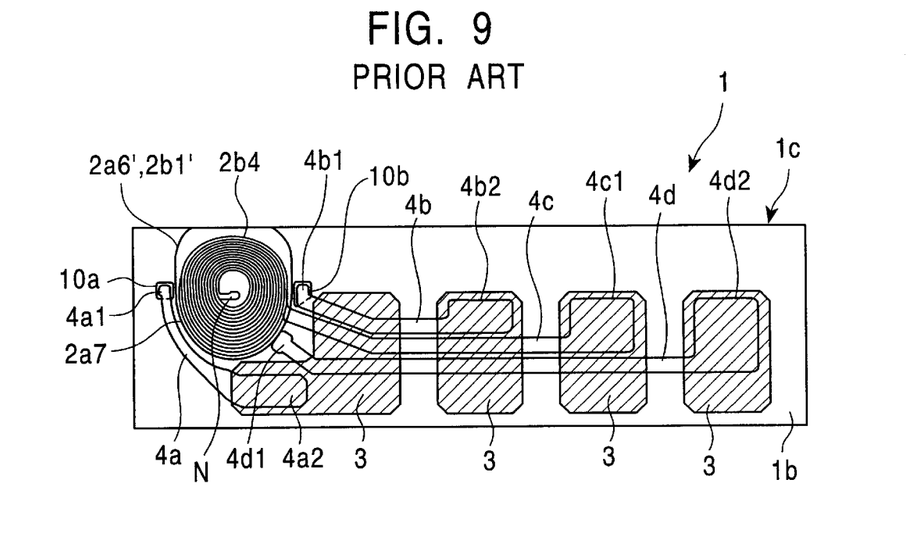
FIG. 9 is a schematic top plan view illustrating a lead-out line pattern of the conventional thin film magnetic head.
Figure 10:
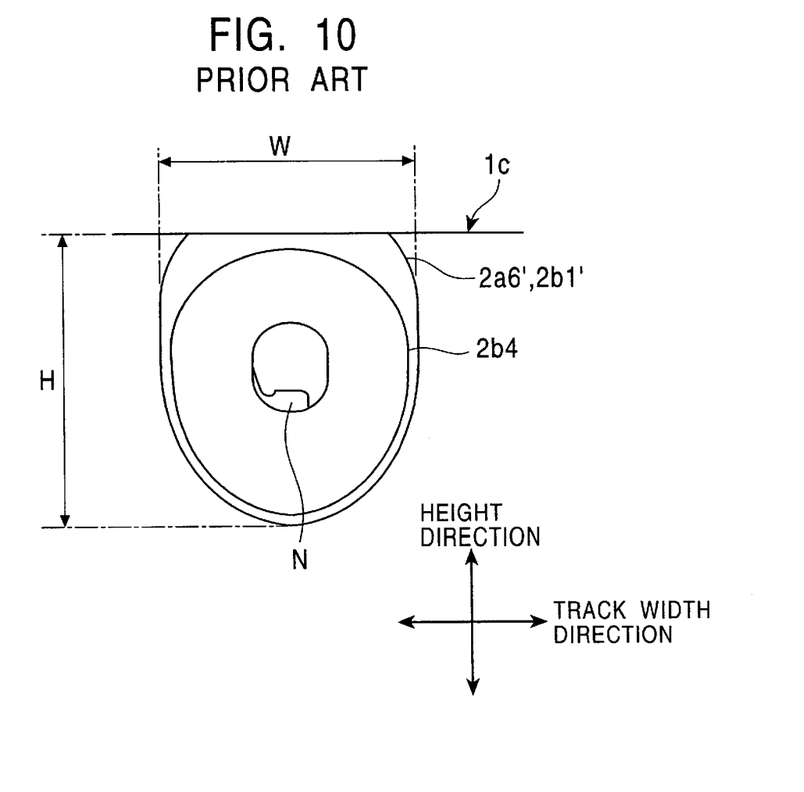
FIG. 10 is a top plan view illustrating an upper shield layer and a coil layer of the conventional thin film magnetic head.

FIG. 5 is a perspective view of a conventional thin film magnetic head, FIG. 6 is a sectional view taken along the line 6—6 of FIG. 5, FIG. 7 is an enlarged front view observed from a direction indicated by an arrow 7 in FIG. 6, and FIG. 8 is a schematic top plan view observed from a direction indicated by an arrow 8 in FIG. 6. Furthermore, FIG. 9 is a schematic top plan view illustrating a lead-out line pattern of the conventional thin film magnetic head, and FIG. 10 is a top plan view illustrating an upper shield layer and a coil layer of the conventional thin film magnetic head.

A slider 1 of a thin film magnetic head mounted on a magnetic recording device such as a hard disk drive is composed of a ceramic material, e.g. a combination of alumina ($Al_2O_3$) and titanium carbide (TiC). The slider 1 has a read end surface 1a facing toward an upstream side of a moving direction of a disk surface of a magnetic recording medium, a trailing end surface 1b facing toward a downstream side, and a rail-shaped ABS surface 1c opposing a disk surface of the slider 1 as shown in FIG. 5. The trailing end surface 1b is provided with a head device 2 and four bonding pads 3 for connection with an external circuit.

The head device 2, which is formed of a thin film, is constituted by a combined-type thin film magnetic head wherein a read magnetoresistive magnetic head (hereinafter referred to as an "MR head") 2a and a write inductive magnetic head (hereinafter referred to as an "inductive head") 2b that is deposited on the MR head 2a as shown in FIG. 6.

Referring to FIG. 6 and FIG. 7, the MR head 2a has a lower shield layer 2a1 formed of a Ni—Fe type alloy or a Permalloy, a lower gap layer 2a2 that is formed of a nonmagnetic material such as $Al_2O_3$ and deposited on the lower shield layer 2a1, a magnetoresistive (MR) device 2a3 provided in a central portion of an upper layer of the lower gap layer 2a2, an electrode layer 2a4 formed from an upper surface of both ends of the MR device 2a3 through a surface of the lower gap layer 2a2, an upper gap layer 2a5 that is provided on the MR device 2a3 and an upper layer of the electrode layer 2a4 and formed of a nonmagnetic material such as $Al_2O_3$, and an upper shield layer 2a6' that is formed on the upper layer of the upper gap layer 2a5 by plating and is formed of a magnetic material such as a Ni—Fe type alloy or Permalloy, all the layers being deposited on a trailing end surface 1b of the slider 1. The MR device 2a3 shown in FIG. 7 illustrates an anisotropic magnetoresistive (AMR) device that is formed of an SAL film Sa, a SHUNT film Sh, and an MR film M having magnetoresistive effect, the films being laminated in this order from the bottom. Furthermore, the electrode layer 2a4 shown in FIG. 7 is comprised of a lower layer that is a hard bias layer H composed of CoPt, CoCrPt or the like, and an upper layer that is an electroconductive layer C composed of chrome (Cr), copper (Cu), or the like. The hard bias layer H applies a bias magnetic field, which is known as a longitudinal bias, to the MR film M in a direction parallel to the film surface thereof. In the MR head 2a, a reading magnetic gap length G1 is decided by a distance between the MR film M and the lower shield layer 2a1 or the upper shield layer 2a6'. A track width Tw is decided by a range wherein sense current flows between the two electrode layers 2a4 at both sides in the MR film M. A giant magnetoresistive (GMR) device may be used as the MR device 2a3.

Referring now to FIG. 6 and FIG. 8, the inductive head 2b includes a lower core layer 2b1' serving also as the upper shield layer 2a6' of the MR head 2a, a nonmagnetic material layer 2b2 that is provided above the lower core layer 2b1' and forms a write magnetic gap G, a coil insulating layers 2b3 and 2b3' that are deposited on the nonmagnetic material layer 2b2 and composed of an organic resin material or the like, flat spiral coil layers 2b4 that are buried in the coil insulating layers 2b3 and 2b3' and composed of a low-resistance electroconductive material such as Cu, and an upper core layer 2b5 that has one end thereof in contact with the nonmagnetic material layer 2b2 adjacent to the ABS surface 1c and the other end thereof connected to the lower core layer 2b1', and is composed of a magnetic material such as a Ni—Fe, type alloy or Permalloy.

Referring now to FIG. 8 and FIG. 9, two connecting terminals 10a and 10b that are formed simultaneously and located away from the lower core layer 2b1' are formed at both sides of the lower core layer 2b1' and connected to the two electrode layers 2a4 that are connected to both ends of the MR device 2a3. Furthermore, four lead-out lines 4a, 4b, 4c, and 4d formed of a low-resistance electroconductive material such as copper (Cu) are provided on the coil insulating layer 2b3 by being plated thereon at the same time when the coil layers 2b4 are formed. Two lead-out lines 4a and 4b respectively have connection ends 4a1 and 4b1 that oppose both sides of the lower core layer 2b1' and are conductively connected to the two connecting terminals 10a and 10b, respectively, via contact holes (not shown) provided in the upper gap layer 2a5. The lead-out line 4c, is integrally formed continuously from an outermost circumferential end of the coil layers 2b4. The lead-out line 4d has a connecting end 4d1 at a side of the lower core layer 2b1' and is connected to a central end N of the coil layers 2b4 via a contact hole (not shown) provided in the coil insulating layer 2b3 by a lead layer 5 provided on the coil insulating layer 2b3 by plating at the same time when the upper core layer 2b5 is formed.

The other ends of the individual lead-out lines 4a, 4b, 4c, and 4d are provided with bump connections 4a2, 4b2, 4c1, and 4d2, and bumps (not shown) formed of a Ni—Fe type alloy or Permalloy, or the like are provided thereon. A protective layer 6 formed of $Al_2O_3$ or the like is provided on the entire trailing end surface 1b of the slider 1, covering the upper layers, including the upper core layer 2b5, the lead-out lines 4a, 4b, 4c, and 4d and the bumps (not shown), etc. Four bonding pads 3 composed of gold are formed by plating on the upper layers of the four bumps (not shown) that have been partly exposed by polishing the trailing end surface 1b, as shown in FIG. 5 and FIG. 9. Thus, the four bonding pads 3 and the head device 2 are electrically connected to make up the conventional thin film magnetic head.

With an increasing capacity of a magnetic recording device such as a hard disk drive, the slider 1 of a thin film magnetic head is becoming smaller, leading to a necessity for an effective disposition of the bonding pads 3 and the head device 2 in a limited space of the trailing end surface 1b. Regarding the head device 2, a size of the coil layers 2b4 is a decisive factor in determining a size or area of the trailing end surface 1b. In order to place the head device 2 in the limited space, the coil layers 2b4 are formed to have an almost circular shape as shown in FIG. 9 or an elliptic shape which is slightly compressed laterally or in a track width direction, while it is longer in a vertical direction orthogonal to the track width direction or height direction (a direction in which a fringing magnetic field is applied from a magnetic recording medium) as shown in FIG. 10.

According to the shape of the vertically elongated coil layers 2b4, the size of the lower core layer 2b1', which also serves as the upper shield layer 2a6', of the inductive head 2b is decided. More specifically, as a dimension of the coil layers 2b4 in the height direction increases, a dimension H in the height direction, rather than a dimension W in the track width direction, of the lower core layer 2b1' or the upper shield layer 2a6' must be increased as shown in FIG. 10.

It has been known that most magnetic materials having shapes excluding a spherical shape exhibit "configuration magnetic anisotropy" in which magnetizing characteristics vary, depending on a direction from a certain point to another arbitrary point. This applies also to the upper shield layer 2a6' or the lower core layer 2b1'. For instance, when the upper shield layer 2a6' is formed of a rectangular or elliptic thin sheet with the dimension H in the height direction set to be larger as mentioned above, the upper shield layer 2a6' develops the configuration magnetic anisotropy. In this case, there is a trend in which an easy axis of magnetization extends in the height direction, i.e. a lengthwise direction, of the upper shield layer 2a6', while a difficult axis of magnetization extends in the widthwise direction or the track width direction orthogonal with respect to the easy axis.

When the MR head 2a reads magnetically recorded signals from a magnetic recording medium, a fringing magnetic field from the magnetic recording medium opposing the ABS surface 1c enters in the height direction as a signal magnetic field. The height direction of the upper shield layer 2a6' in which the fringing magnetic field is applied is the easy axis of magnetization as mentioned above, so that a magnetization curve shows a hysteresis indicating an irreversible change.

When a magnetic material has a hysteresis, a microscopic observation reveals that a magnetic domain wall irreversibly moves from a certain position to another position when subjected to a magnetic field. It has been known that the irreversible movement of the magnetic domain wall causes noises called "Barkhausen noises" to occur. Therefore, when the fringing magnetic field that consecutively changes is applied in the height direction that involves the hysteresis when the MR head 2a reads the magnetically recorded signals from the magnetic recording medium, the Barkhausen noises are superimposed together with the signal magnetic field on the MR film M, causing read errors in the MR head 2a.

SUMMARY OF THE INVENTION

Accordingly, the present invention has been made with a view toward solving the problems described above, and it is an object thereof to provide a thin film magnetic head that permits a size of a slider to be reduced and is capable of reducing occurrences of Barkhausen noises caused by configuration magnetic anisotropy of an upper shield layer.

To this end, according to an aspect of the present invention, there is provided a combined-type thin film magnetic head in which a read head that includes a MR device, and an inductive head are laminated, wherein the inductive head has a magnetic material layer having a space for forming at least a coil layer thereon, the magnetic material layer has a front separate layer opposing a magnetic recording medium, a rear separate layer disposed away from the magnetic recording medium with a gap provided relative to the front separate layer, and an upper core layer having one end thereof coupled to a top portion of the front separate layer and also extending onto the coil layer and the other end thereof coupled on a surface opposing the magnetic recording medium via a magnetic gap, the front separate layer serves also as an upper shield layer of a read section and a lower core layer of the inductive head and supports the coil layer in cooperation with the rear separate layer, and a dimension in a track width direction of the front separate layer is larger than a dimension in a direction orthogonal with respect to the track width direction.

Preferably, in the thin film magnetic head in accordance with the present invention, the coil layer is formed over the gap that separates the front separate layer and the rear separate layer so that it is substantially orthogonalized with respect to a lengthwise direction of the gap.

Further preferably, in the thin film magnetic head in accordance with the present invention, the front separate layer is longer than the rear separate layer in the track width direction, and both ends of the front separate layer extend to both sides of the rear separate layer.

Further preferably, in the thin film magnetic head in accordance with the present invention, two lead-out lines that connect the MR device and bonding pads for connection with an external circuit, and connecting terminals for connecting the MR device and ends of the two lead-out lines are located within a range in the track width direction of the front separate layer and provided at both sides of the rear separate layer.

In a further preferred form, the thin film magnetic head in accordance with the present invention is provided with two lead-out lines for connection between the MR device and the bonding pads for connection with an external circuit, and ends of the two lead-out lines connected to the MR device lie within a range of the track width direction of the front separate layer and are provided at both sides of the rear separate layer.

DESCRIPTION OF THE PREFERRED EMBODIMENTS

Figure 1:
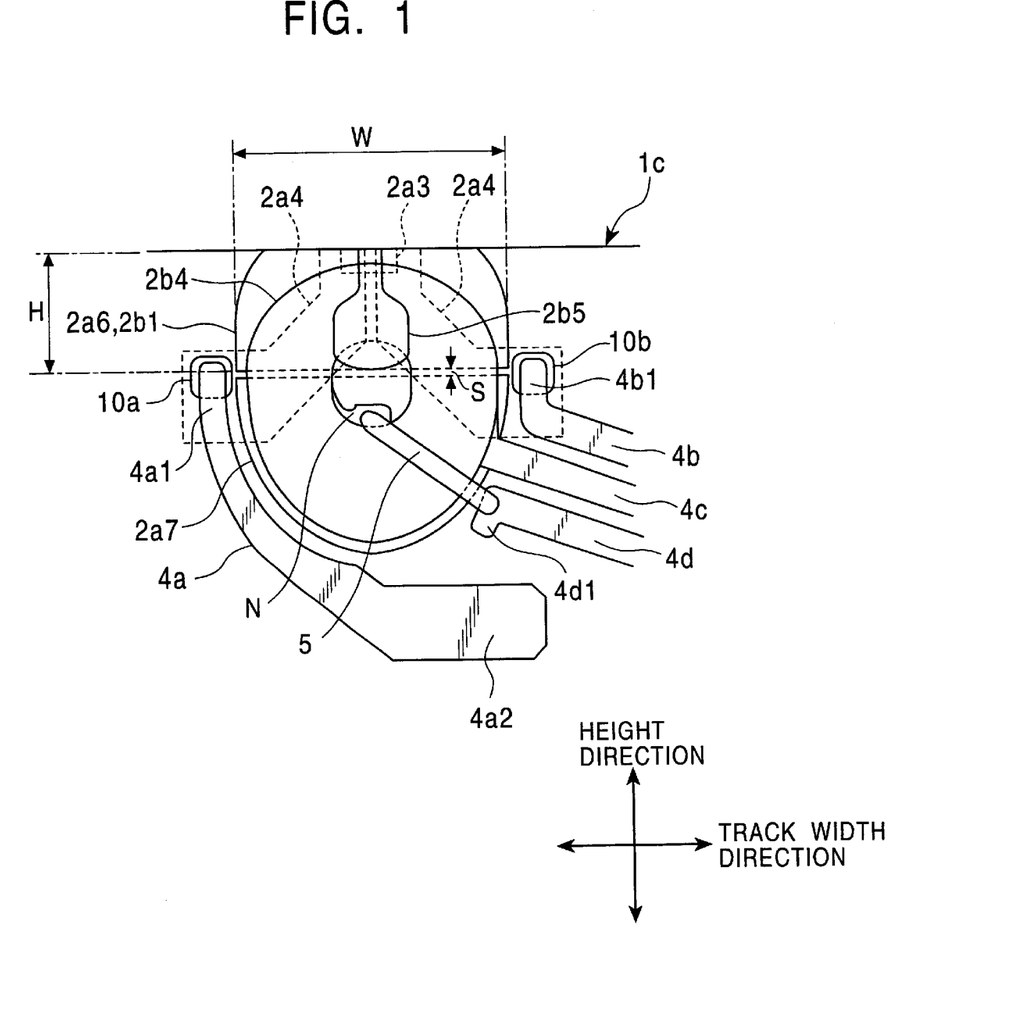
FIG. 1 is an enlarged front view of a thin film magnetic head in accordance with the present invention.
Figure 2A:
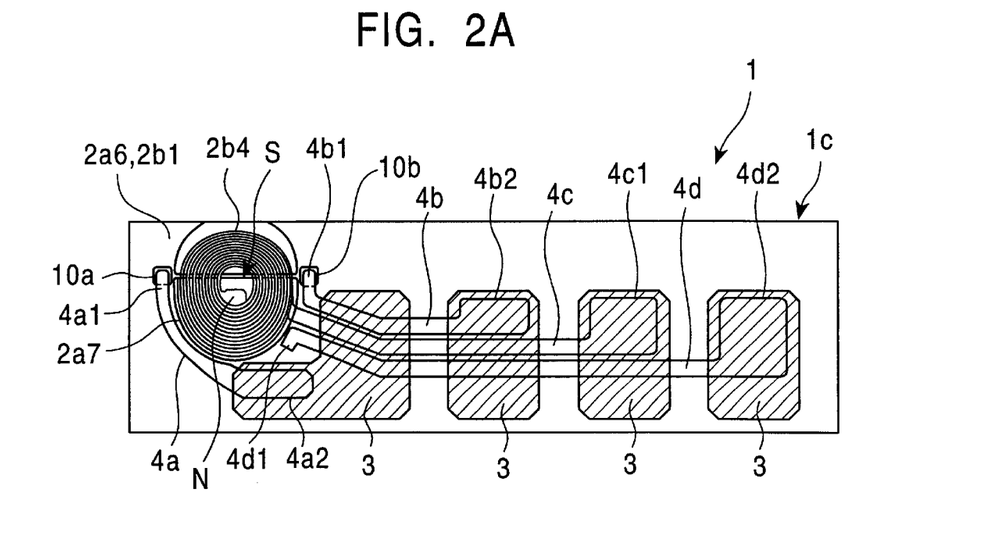
FIG. 2 provides schematic representations showing a first embodiment of the thin film magnetic head in accordance with the present invention.
Figure 2B:
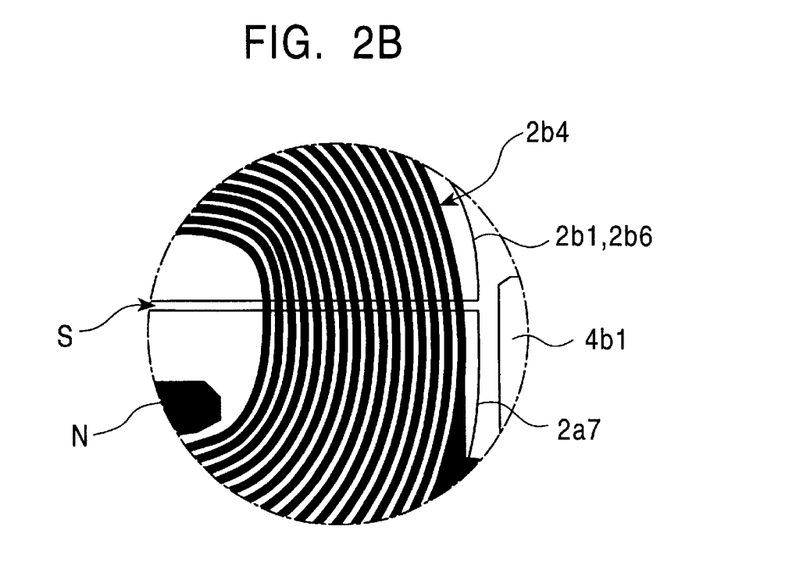
Figure 3:
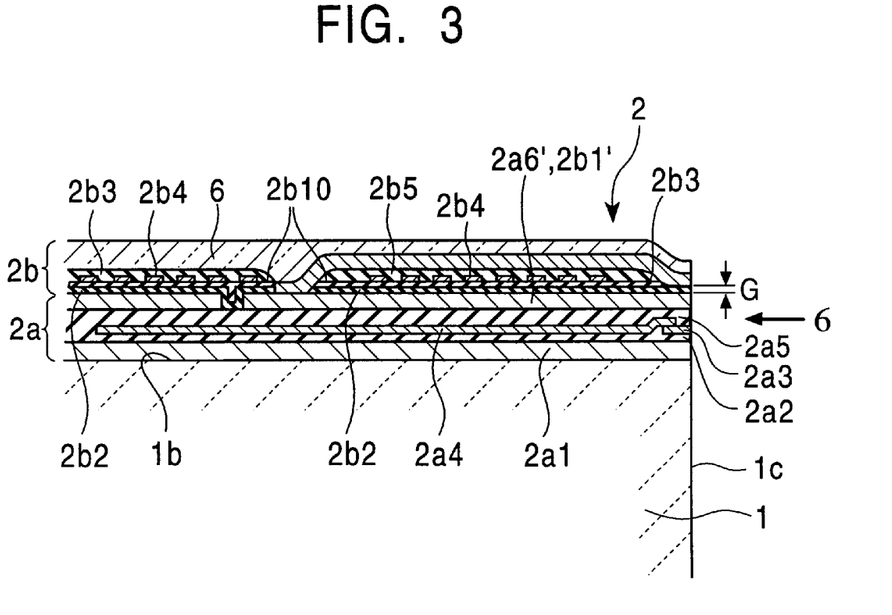
FIG. 3 is a sectional view of an essential section of the first embodiment of the thin film magnetic head in accordance with the present invention.
Figure 4A:
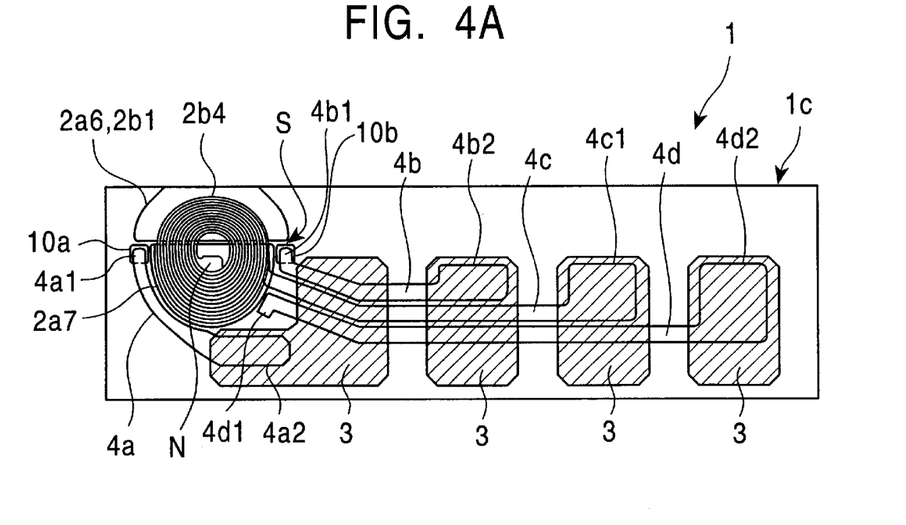
FIG. 4 is a schematic representation showing a second embodiment of the thin film magnetic head in accordance with the present invention.
Figure 4B:
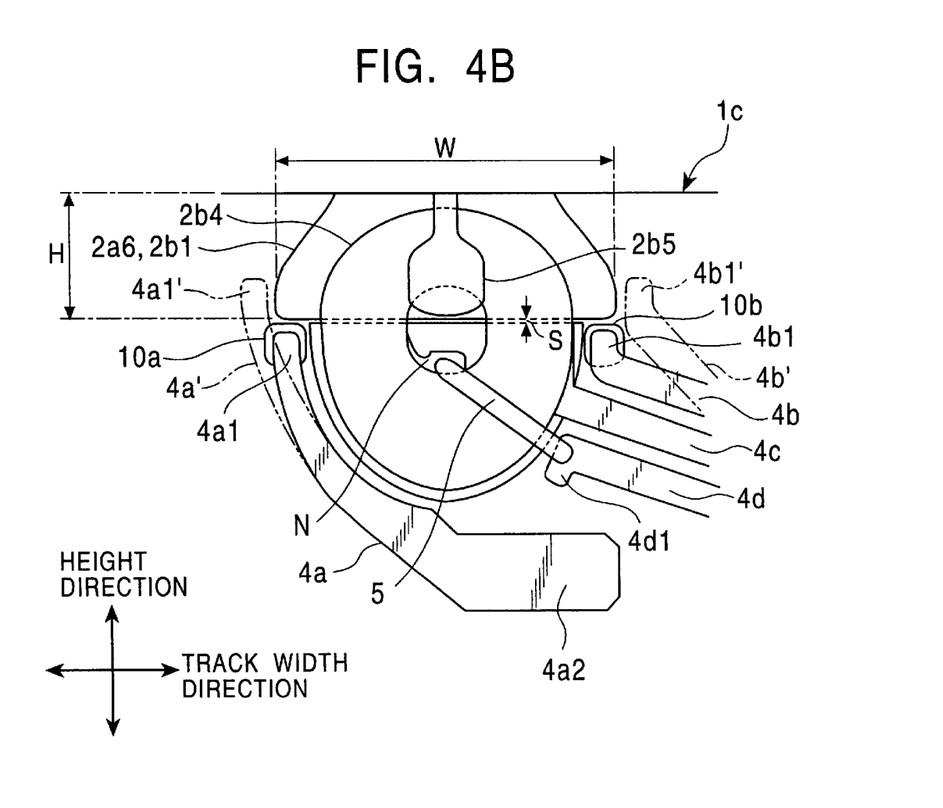

Embodiments of a thin film magnetic head in accordance with the present invention will now be described. FIG. 1 is an enlarged front view of the thin film magnetic head in accordance with the present invention. FIG. 2 provides schematic representations of a first embodiment of the thin film magnetic head of the present invention, wherein FIG. 2A is a schematic top plan view illustrating a lead-out line pattern of the thin film magnetic head of the present invention and FIG. 2B is an enlarged view of an essential section of FIG. 2A. FIG. 3 is a sectional view of an essential section of the first embodiment of the thin film magnetic head of the present invention. FIG. 4 provides schematic representations of a second embodiment of the thin film magnetic head of the present invention, wherein FIG. 4A is a schematic top plan view illustrating a lead-out line pattern of the thin film magnetic head of the present invention and FIG. 4B is an enlarged view of an essential section of FIG. 4A. Like reference numerals will be assigned to like components or portions in the conventional thin film magnetic head, and descriptions thereof will be partly omitted.

(First Embodiment)

A first embodiment of a thin film magnetic head in accordance with the present invention will be described. As in the case of the conventional thin film magnetic head, a slider 1 employed for the thin film magnetic head of the present invention is formed of a ceramic material, e.g. a combination of alumina ($Al_2O_3$) and titanium carbide (TiC). The slider 1 has a read end surface 1a facing toward an upstream side of a moving direction of a disk surface of a magnetic recording medium, a trailing end surface 1b facing toward a downstream side, and a rail-shaped ABS surface 1c opposing a disk surface of the slider 1 as shown in FIG. 5. The trailing end surface 1b is provided with a head device 2 and four bonding pads 3 for connection with an external circuit. The head device 2 is formed of a thin film and constituted by a read MR head 2a and a write inductive head 2b deposited thereon as shown in FIG. 6.

A major section of the MR head 2a is identical to that of the conventional thin film magnetic head shown in FIG. 6 and FIG. 7, and has a lower shield layer 2a1 formed of a Ni—Fe type alloy or a Permalloy formed by a vacuum deposition process such as sputtering on the trailing end surface 1b of the slider 1, a lower gap layer 2a2 that is formed of a nonmagnetic material such as $Al_2O_3$ and deposited on the lower shield layer 2a1, a magnetoresistive (MR) device 2a3 provided in a central portion of an upper layer of the lower gap layer 2a2, electrode layers 2a4 formed from an upper surface of both ends of the MR device 2a3 through a surface of the lower gap layer 2a2, and an upper gap layer 2a5 that is provided on the MR device 2a3 and an upper layer of the electrode layer 2a4 and formed of a nonmagnetic material such as $Al_2O_3$.

The thin film magnetic head of the present invention is characteristic in that an upper layer of the upper gap layer 2a5 is provided with a front separate layer 2a6 that serves as an upper shield layer composed of a magnetic material such as a Ni—Fe type alloy or Permalloy and is formed by plating on a side adjacent to the ABS surface 1c opposing the magnetic recording medium, and a rear separate layer 2a7 separated from the front separate layer 2a6 with a very narrow gap S of a predetermined width as shown in FIG. 1. The front separate layer 2a6 and the rear separate layer 2a7 can be easily formed by frame plating. The front separate layer 2a6 and the rear separate layer 2a7 are formed with substantially the same film thickness and their upper surfaces are substantially flush. The very narrow gap S that separates the front separate layer 2a6 and the rear separate layer 2a7 is filled with an insulating material or the like for a resist used for frame plating, and its upper surface is etched to be substantially flush with the tops surfaces of the front separate layer 2a6 and the rear separate layer 2a7. The gap S is provided so that it is substantially parallel to the ABS surface 1c, and also formed so that it linearly divides a central portion of the coil layer 2b4.

Referring to FIG. 1 and FIG. 2A, in the inductive head 2b, the front separate layer 2a6 (2b1) serves also as a lower core layer, and a nonmagnetic material layer 2b2 forming a write magnetic gap is provided on the front separate layer 2a6 (2b1) and the rear separate layer 2a7. Furthermore, provided on the nonmagnetic material layer 2b2 are coil insulating layers 2b3 and 2b3' formed of laminated organic resin material or the like, planar spiral coil layers 2b4 that are buried in the coil insulating layers 2b3 and 2b3' and formed by photolithography and plating by using a low-resistance electroconductive material such as Cu, and an upper core layer 2b5 that has one end thereof in contact with the nonmagnetic material layer 2b2 on a side adjacent to the ABS surface 1c and the other end thereof connected to the front separate layer 2a6 (2b1) and is formed of a magnetic material such as a Ni—Fe alloy or Permalloy as in the case of the conventional thin film magnetic head shown in FIG. 6 and FIG. 8. As previously mentioned, the rear separate layer 2a7 is substantially flush with the front separate layer 2a6 (2b1) and functions as a "coil supporting layer" to form the coil layers 2b4 to the same height. Furthermore, as shown in FIG. 2B, the coil layers 2b4 are formed such that they are substantially orthogonalized with respect to a lengthwise direction of the gap S at above the gap S. Referring to FIG. 1, two connecting terminals 10a and 10b that are separated from the front separate layer 2a6 and the rear separate layer 2a7 and connected to the two electrode layers 2a4 of the MR device 2a3 via through holes of the upper gap layer 2a5 are formed on both sides of the rear separate layer 2a7. The two connecting terminals 1a and 10b are formed by plating at the same time when the front separate layer 2a6 and the rear separate layer 2a7 are formed.

Referring now to FIG. 2A, four lead-out lines 4a, 4b, 4c, and 4d formed of a low-resistance electroconductive material such as copper (Cu) are provided on the coil insulating layer 2b3 by being plated thereon at the same time when the coil layers 2b4 are formed. Two lead-out lines 4a and 4b respectively have connection ends 4a1 and 4b1 that oppose both sides of the lower core layer 2b1 and are conductively connected to the two electrode layers 2a4 via the two connecting terminals 10a and 10b. The lead-out line 4c, is integrally formed continuously from an outermost circumferential end of the coil layers 2b4. The lead-out line 4d has a connecting end 4d1 at a side of the lower core layer 2b1 and is connected to a central end N of the coil layers 2b4 via a contact hole (not shown) provided in the coil insulating layer 2b3 by a lead layer 5 provided on the coil insulating layer 2b3 by plating at the same time when the upper core layer 2b5 is formed.

The other ends of the individual lead-out lines 4a, 4b, 4c, and 4d are provided with bump connections 4a2, 4b2, 4c1, and 4d2, and bumps (not shown) formed of gold (Au) or nickel (Ni) or the like are provided thereon. A protective layer 6 formed of $Al_2O_3$ or the like is provided on the entire trailing end surface 1b of the slider 1, covering the upper layers, including the upper core layer 2b5, the lead-out lines 4a, 4b, 4c, and 4d and the bumps (not shown), etc. Four bonding pads 3 for connection with an external circuit that are composed of gold are formed by plating on the upper layers of the four bumps (not shown) that have been partly exposed by polishing the trailing end surface 1b, as shown in FIG. 2A. Thus, the four bonding pads 3, the MR head 2a, and the inductive head 2b are electrically connected to make up the thin film magnetic head in accordance with the present invention.

As described above, the magnetic material layer employed as the upper shield layer or the lower core layer is divided into the front separate layer 2a6 (2b1) and the rear separate layer 2a7, so that the dimension W in the track width direction is larger than the dimension H in the height direction as shown in FIG. 1. Hence, the configuration magnetic anisotropy in the front separate layer 2a6 or 2b1 serving as the upper shield layer or the lower core layer is such that the easy axis of magnetization is in the track width direction and the difficult axis of magnetization is in the height direction. Thus, Barkhausen noises will not occur in the height direction in which fringing magnetic fields are applied from the magnetic recording medium by the MR head 2a.

Since the upper surface of the front separate layer 2a6 (2b1) and the upper surface of the rear separate layer 2a7 are substantially flush and the width of the gap S is very small, the nonmagnetic material layers 2b2 thereon are formed to match the configuration of the gap S. Referring to FIG. 3, to deposit the coil layers 2b4 on the nonmagnetic material layers 2b2, flattening insulative layers 2b10 composed of resist films are first formed on the nonmagnetic material layers 2b2, which are provided on the upper layers of the front separate layer 2a6 (2b1) and the rear separate layer 2a7, such that the upper surfaces thereof become flat and smooth. Then, resist layers are applied to the flat, smooth upper surfaces, and subjected to lithography to produce a pattern of the coil layers 2b4 by exposure and development. Lastly, the coil layers 2b4 are finished by plating with copper or the like. If, for example, the upper surface of the front separate layer 2a6 (2b1) and the upper surface of the rear separate layer 2a7 are not substantially flush and therefore a step is produced therebetween when the nonmagnetic material layers 2b2 are formed at the gap S by using an inorganic material or the like, then irregular reflection of exposure light takes place when exposing and developing the pattern of the coil layers 2b4 on the resist layers, making it impossible to achieve the formation with high accuracy. In this embodiment, the upper surfaces of the flattening insulative layers 2b10 composed of the resist films are formed to be flat and smooth as mentioned above; therefore, the coil layers 2b4 are formed with high accuracy. Furthermore, the coil layers 2b4 are formed over the gap S such that it is substantially orthogonalized with the lengthwise direction of the gap S. This minimizes the length of the coil layers 2b4 covering the gap S, and even if there is a small step on the upper surfaces of the flattening insulative layers 2b10 positioned on the gap S, the influences by the irregular reflection of the exposure light in the process of exposing and developing the pattern of the coil layers 2b4 on the resist layers can be controlled to a minimum, thus permitting highly accurate formation to be achieved.

(Second Embodiment)

A second embodiment of the thin film magnetic head in accordance with the present invention will now be described. The second embodiment differs from the first embodiment in that the dimension W in the track width direction of the front separate layer 2a6 (2b1) is greater than that of the rear separate layer 2a7, and both end portions of the front separate layers 2a6 (2b1) extend to both sides of the rear separate layers 2a7 as shown in FIG. 4. With this arrangement, the dimension W in the track width direction with respect to the dimension H in the height direction is further greater in the front separate layer 2a6 (2b1). As a result, the configuration magnetic anisotropy is further enhanced wherein the easy axis of magnetization is oriented in the track width direction and the difficult axis of magnetization is oriented in the height direction. Thus, occurrence of Barkhausen noises can be further securely controlled in the height direction in which fringing magnetic fields are applied from a magnetic recording medium by the MR head 2a.

An extra space is required for the layout described above. More specifically, according to the layout, the front separate layer 2a6 (2b1) extends in the track width direction, the two lead-out lines 4a and 4b and the two connecting terminals 10a and 10b for making connection between the electrode layer 2a4 of the MR device 2a3 and the bonding pads 3 are disposed at the sides of the gap S as indicated by dashed lines 4a' and 4b' in FIG. 4, and the connecting ends are located at positions indicated by 4a1' and 4b1'. To save the space, the connecting ends 4a1 and 4b1 of the two lead-out lines 4a and 4b and the two connecting terminals 10a and 10b are provided such that they are located within a space range in the track width direction of the front separate layer 2a6 (2b1) and are located at both sides of the rear separate layer 2a7. This arrangement enables a smaller slider to be accomplished, so that the space on the trailing end surface 1b can be effectively used even if a free space is limited.

As described above, the thin film magnetic head in accordance with the present invention is a combined-type thin film magnetic head in which a read head that includes an MR device and an inductive head are laminated, wherein the inductive head has a magnetic material layer having a space for forming at least a coil layer thereon, the magnetic material layer has a front separate layer opposing a magnetic recording medium, a rear separate layer disposed away from the magnetic recording medium with a gap provided relative to the front separate layer, and an upper core layer having one end thereof coupled to a top portion of the front separate layer and also extending to above the coil layer and the other end thereof coupled on a surface opposing the magnetic recording medium via a magnetic gap, the front separate layer serves also as an upper shield layer of a read section and a lower core layer of the inductive head, and supports the coil layer in cooperation with the rear separate layer, and a dimension in a track width direction of the front separate layer is larger than a dimension in a direction orthogonal to the track width direction, so that configuration magnetic anisotropy in the front separate layer as the upper shield layer or the lower core layer is such that an easy axis of magnetization is oriented in the track width direction. Thus, Barkhausen noises are not generated in the height direction that is orthogonalized with the track width direction in which fringing magnetic fields from a magnetic recording medium are applied. This arrangement prevents Barkhausen noises from being applied together with signal magnetic fields to the MR film, thereby inhibiting occurrence of read errors by the MR head.

According to the thin film magnetic head of the present invention, the coil layer is formed over the gap that separates the front separate layer and the rear separate layer so that it is substantially orthogonalized with respect to the lengthwise direction of the gap. This arrangement minimizes the length of the coil layer covering the gap, permitting the coil layer to be formed with high accuracy.

According to the thin film magnetic head of the present invention, the front separate layer is longer than the rear separate layer in the track width direction, and both ends of the front separate layer extend to both sides of the rear separate layer. With this arrangement, the configuration magnetic anisotropy is further enhanced, making it possible to further securely control the occurrence of Barkhausen noises in the height direction in which fringing magnetic fields from a magnetic recording medium are applied.

According to the thin film magnetic head of the present invention, two lead-out lines that connect the MR device and bonding pads for connection with an external circuit, and connecting terminals for connecting the MR device and ends of the two lead-out lines are located within a range in the track width direction of the front separate layer and provided at both sides of the rear separate layer. This arrangement makes it possible to successfully cope with a situation wherein a free space on the trailing end surface is limited due to a reduced size of a slider.

What is claimed is:

1. A combined-type thin film magnetic head in which a read head that includes a magnetoresistive device, and an inductive head are laminated, wherein the inductive head has a magnetic material layer having a space for forming at least a coil layer thereon;

the magnetic material layer comprises:

a front separate layer opposing a magnetic recording medium;

a rear separate layer disposed away from the magnetic recording medium with a gap provided relative to the front separate layer; and an upper core layer having one end thereof coupled to a top portion of the front separate layer and also extending onto the coil layer and the other end thereof connected to a surface opposing the magnetic recording medium via a magnetic gap;

the front separate layer serves also as an upper shield layer of a read section and a lower core layer of the inductive head, and supports the coil layer in cooperation with the rear separate layer;

a dimension in a track width direction of the front separate layer is larger than a dimension in a direction orthogonal with respect to the track width direction; and the front separate layer is longer than the rear separate layer in the track width direction, and both ends of the front separate layer extend to both sides of the rear separate layer.

2. A thin film magnetic head according to claim 1, wherein the coil layer is formed over the gap that separates the front separate layer and the rear separate layer so that it is substantially orthogonalized with respect to a lengthwise direction of the gap.

3. A thin film magnetic head according to claim 1, wherein two lead-out lines that connect the magnetoresistive device and bonding pads for connection with an external circuit, and a connecting terminal for connecting the magnetoresistive device and ends of the two lead-out lines are located within a range in the track width direction of the front separate layer and provided on both sides of the rear separate layer.

4. A thin film magnetic head according to claim 1, wherein the front separate layer and the rear separate layer have substantially the same thickness.

5. A thin film magnetic head according to claim 1, wherein the front separate layer and the rear separate layer have upper surfaces that are substantially flush.

6. A thin film magnetic head according to claim 5, wherein the gap that separates the front separate layer and the rear separate layer is filled with an insulating material.

7. A thin film magnetic head according to claim 6, wherein the insulating material of the gap is substantially flush with an upper layer of one of the front separate layer and the rear separate layer.

8. A thin film magnetic head according to claim 1, wherein the front separate layer and the rear separate layer are formed from the same material.

9. A thin film magnetic head according to claim 1, wherein the front separate layer and the rear separate layer are formed from one of a Ni—Fe alloy and Permalloy.

10. A thin film magnetic head according to claim 1, wherein the front separate layer and the rear separate layer are formed from a plated magnetic material.

11. A thin film magnetic head according to claim 1, wherein the gap that separates the front separate layer and the rear separate layer divides a central portion of the coil layer.

12. A thin film magnetic head according to claim 1, wherein the gap that separates the front separate layer and the rear separate layer is substantially parallel with a surface that opposes the magnetic recording medium.

13. A thin film magnetic head according to claim 1, wherein the gap that separates the front separate layer and the rear separate layer is filled with an insulating material.

14. A thin film magnetic head according to claim 13, wherein the insulating material of the gap is substantially flush with an upper layer of one of the front separate layer and the rear separate layer.

15. A thin film magnetic head according to claim 1, wherein the gap that separates the front separate layer and the rear separate layer has a width substantially smaller than the dimension of the front separate layer in the direction orthogonal with respect to the track width direction.

16. A thin film magnetic head according to claim 1, wherein the gap that separates the front separate layer and the rear separate layer has a width substantially smaller than the dimension of the rear separate layer in the direction orthogonal with respect to the track width direction.

* * * * *